Patented Dec. 6, 1932

1,889,952

UNITED STATES PATENT OFFICE

MARTIN MUELLER-CUNRADI, OF LUDWIGSHAFEN-ON-THE-RHINE, AND FRITZ EGGERT, OF MANNHEIM, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

POLYMERIZATION PRODUCTS OF γ BUTYLENES

No Drawing. Application filed June 14, 1929, Serial No. 371,047, and in Germany August 7, 1928.

This invention relates to improvements in the manufacture and production of polymerization products of γ-butylenes.

We have found that polymerization products, and in particular dimers besides only small quantities of trimers and higher polymerization products of γ-butylenes, for example of γ-butylene itself or of its homologues such as trimethylethylene are obtained in good yields in an advantageous manner by treating the said hydrocarbons or gases containing the same with comparatively strong, about from 50 to 60 per cent, sulphuric acid, thereupon heating the sulphuric acid solution obtained, for example, to about 100° centigrade. After removing the polymerization products, which separate out during the heating, the sulphuric acid may be cooled, if desired, and again be employed for the treatment of a further quantity of hydrocarbons.

The treatment of the said hydrocarbons is usually completed in a comparatively short time, and is dependent on the concentration of the acid employed. Thus, for example, in the case of the employment of an acid of 55 per cent strength the treatment may take, for example about 12 minutes, whereas when an acid of 60 per cent strength is employed it takes about 7 minutes. It should be understood that the periods given are only intended to denote the relative duration when employing different concentration of acids under otherwise like conditions and not the absolute durations of the treatment. The solution is usually heated to about 100° centigrade.

The adsorption of the hydrocarbons by means of the sulphuric acid can be carried out at ordinary pressure or at elevated pressures. The heating of the sulphuric acid solution for the purpose of polymerizing the hydrocarbons is preferably carried out by allowing the solution to flow through a heated tubular system, in which it is advantageous to arrange for the solution which is to be heated to act as the cooling agent for the sulphuric acid which has been freed from reaction products and which is to be cooled.

The following example will further illustrate the nature of the said invention but the invention is not restricted thereto.

Example

A gas containng about 10 per cent of γ-butylene, about 4 per cent of trimethyl ethylene besides small amounts of other butylenes and amylenes, 40 per cent of butane, 20 per cent of pentane, 15 per cent of hydrogen, 6 per cent of methane and other hydrocarbons is passed through a washing tower through which an approximately 55 per cent sulphuric acid solution is trickling in such a manner that the major portion of the hydrocarbons is absorbed by the sulphuric acid. The solution is then heated to about 100° centigrade, for example in a tubular worm, in which it enters at the bottom. The polymerization of the hydrocarbons then proceeds in such a manner that the polymerization product separates out as oil consisting of about 80 per cent of dimers and about 20 per cent of higher polymers, in particular trimers of γ-butylene and trimethyl ethylene. After separation of the polymerization products the sulphuric acid is cooled and again passed through the washing tower.

In a similar manner, instead of the mixture of the two hydrocarbons, each hydrocarbon can be separately subjected to the described polymerization.

What we claim is:—

1. A process for the production of dimers of γ-butylenes, besides only small quantities of trimers and higher polymerization products, which comprises treating a γ-butylene with a sulphuric acid of between about 50 and 60 per cent strength, thereupon heating the sulphuric acid solution, removing the polymerization products which separate out during the heating, cooling the remaining sulphuric acid and employing it over again for the treatment of a further quantity of a γ-butylene.

2. A process for the production of dimers of γ-butylenes, besides only small quantities of trimers and higher polymerization products, which comprises treating a γ-butylene with a sulphuric acid of between about 50 and 60 per cent strength, thereupon heating the sulphuric acid solution to about 100° C., removing the polymerization products which separate out during the heating, cooling the remaining sulphuric acid and employing it over again for the treatment of a further quantity of a γ-butylene.

3. A process for the production of dimers of γ-butylenes, besides only small quantities of trimers and higher polymerization products, which comprises treating a γ-butylene with a sulphuric acid of between about 50 and 60 per cent strength, and thereupon heating the sulphuric acid solution.

4. A process for the production of dimers of γ-butylenes, besides only small quantities of trimers and higher polymerization products, which comprises treating a γ-butylene with a sulphuric acid of between about 50 and 60 per cent strength and thereupon heating the sulphuric acid solution to about 100° C.

In testimony whereof we have hereunto set our hands.

MARTIN MUELLER-CUNRADI.
FRITZ EGGERT.